United States Patent Office 3,590,050
Patented June 29, 1971

3,590,050
INDOLE INTERMEDIATES
Torleif Utne, Bound Brook, Ronald B. Jobson, Old Bridge, and Alfred V. Lovell, Roselle, N.J., assignors to Merck & Co., Inc., Rahway, N.J.
No Drawing. Filed Nov. 22, 1968, Ser. No. 778,340
Int. Cl. C07d 27/16
U.S. Cl. 260—326.3
2 Claims

ABSTRACT OF THE DISCLOSURE

The process for synthesizing 3-indolyl acetic acid compounds through the preparation of novel intermediate lactam and levulinic acid compounds is described.

This invention relates to a process for preparing 1-p-chlorobenzoyl-2-methyl-5-dimethylamino-3 - indolyl acetic acid. This invention further relates to novel intermediate compounds for the preparation of this 3-indolyl acetic acid compound and for processes for preparing said intermediates.

In the past, the 3-indolyl acetic acid compounds have been prepared by reacting a substituted phenyl hydrazine with a levulinic acid ester to form a N–1 unsubstituted indolyl-3-acetic acid ester, acylation of the N–1 position with p-chlorobenzoyl chloride, after activation of the N–1 nitrogen with sodium hydride, and subsequent hydrolysis of the ester to afford the free acid. In this process, sodium hydride is required in order to activate the indole nitrogen so as to allow for acylation. Further, because sodium hydride is required, it is necessary to protect the acid side chain on the indole by preparing the indole-3-acetic acid ester, which ester is subsequently removed after acylation.

We have found a novel process for preparing this indole-3-acetic acid compound wherein the acylation is carried out prior to ring closure. The need for activating the nitrogen with a strong base has thus been eliminated. Further, because acylation can be carried out without the use of sodium hydride, the need for protection of the acid side chain is also eliminated.

It is therefore an advantage of the present invention that acylation be carried out without the use of sodium hydride and without the need for protection of the acid side chain. Further advantages of the process will become evident as the invention is more fully described, and by referring to the following flow sheet.

FLOW SHEET I

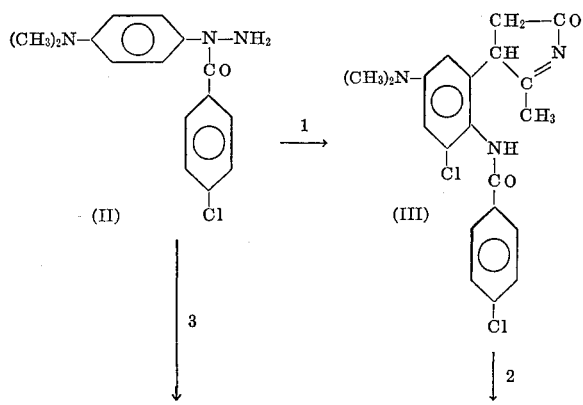

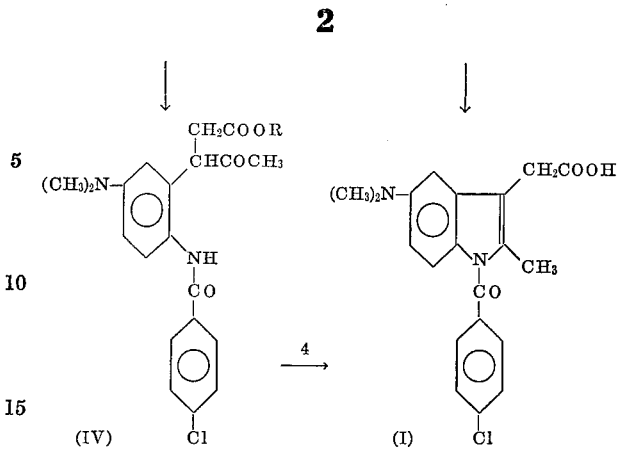

where R is hydrogen, lower alkyl or tetrahydropyranyl.

Compound II may be converted to the corresponding lactam compound (III) by reaction with levulinic acid or levulinic acid esters in the presence of acid and subsequently converted to Compound I in the presence of an acid catalyst. Alternatively, Compound II may also be converted to the corresponding levulinic acid compound (IV) or its esters by reaction with levulinic acid or levulinic acid esters in the presence of acid, and then ring closed to Compound I in the presence of an acid catalyst.

The following is a further description of the process steps in Flow Sheet I.

Steps 1 and 3—Condensation of α-p-chlorobenzoyl-p-dimethylaminophenyl hydrazine with levulinic acid or its esters is carried out in the presence of an acid at elevated temperatures in a solvent, preferably an inert solvent. Acids which may be used are such as hydrochloric acid, fluoboric acid, acetic acid, phosphoric acid, zinc chloride, pyridine sulfur trioxide, polyphosphoric acid, etc. However, it is preferable to use a mineral acid such as hydrochloric acid. The reaction is usually carried out at temperatures between 50–100° C., and preferably between 70–90° C. Solvents which may be used are such as t-butanol, benzene, toluene, dimethylsulfoxide, methanol, acetonitrile, dioxane, levulinic acid and levulinic acid esters. If desired, excess levulinic acid or its esters may be used as a solvent as well as a reactant. Mixtures of levulinic acid or its esters and other solvents may also be employed if so desired. If an ester of levulinic acid is used, it should be one which is easily removed such as t-butyl or tetrahydropyranyl ester.

Steps 2 and 4—Cyclization of the lactam of levulinic acid, levulinic acid or its esters is carried out in the presence of an acid at elevated temperatures and in a solvent, preferably an inert solvent. Acids which may be used are such as hydrochloric acid, fluoboric acid, acetic acid, phosphoric acid, zinc chloride, pyridine sulfur trioxide, polyphosphoric acid, etc. However, it is preferable to use a mineral acid such as hydrochloric acid. The reaction is usually carried out at temperatures between 50–100° C., and preferably between 70–90° C. Solvents which may be used are such as t-butanol, benzene, toluene, dimethylsulfoxide, acetone, methanol, acetonitrile, dioxane, etc. If it is desired, levulinic acid or its esters may also be used as a solvent.

α-p-Chlorobenzoyl-p - dimethylaminophenyl hydrazine (II) is prepared by condensing the p-dimethylaminophenyl hydrazine or its salts with an aldheyde or ketone under known reaction conditions to form the hydrazone. The α-nitrogen of the hydrazone is then acylated using a p- chlorobenzoyl halide or p-chlorobenzoyl anhydride in the presence of a weak base such as pyridine. Acid catalyzed cleavage in the presence of an aqueous acid produces the preferential cleavage of the hydrazone without cleavage of the acyl group on the α-nitrogen and gives α-p-chlorobenzoyl-p - dimethylaminophenyl hydrazine. Hydrazone formation is preferably carried out with benzaldehyde which can then easily be cleaved in the presence of a concentrated strong acid after the acylation step has been carried out.

This process is not limited to those compounds substituted at the N–1 position with a p-chlorobenzoyl group. When various α-p-substituted-benzoyl - p - dimethylaminophenyl hydrazines are used as starting materials, the corresponding 1 - p - substituted - benzoyl - 2 - methyl-5-dimethylaminoindole-3-acetic acid compounds are prepared. Substituents which may be present are such as fluorine, bromine, iodine, hydrogen, dialkylamino, etc.

The Compound I, prepared by the process described above, has a high degree of anti-inflammatory activity and is used in the treatment of diseases which are susceptible to anti-inflammatory agents. For this purpose, this compound may be administered to patients in capsules, tablets and the like, in dose levels of 10–500 mgs. per day.

The following examples are given to further describe the invention.

EXAMPLE 1

3-[2'-(p-chlorobenzamido)-5'-dimethylaminophenyl]-levulinic lactam (III)

α - p - chlorobenzoyl - p - dimethylaminophenyl hydrazine, 2.0 g. (.0069 mole), is dissolved in 5 ml. of warm methanol into which anhydrous hydrogen chloride gas is bubbled with cooling for about five minutes. The pink solution is concentrated to dryness under vacuum, and the residue pumped under high vacuum for about 15 minutes. The residual solid dihydrochloride salt is slurried in 150 ml. of t-butanol and 1.0 g. (.0086 mole) of levulinic acid is added with stirring. The mixture is heated under nitrogen at reflux temperature for one hour, during which all solids dissolve and the solution becomes dark brown. An additional 1.0 g. of levulinic acid is added and the oslution refluxed for another hour. The dark solution is concentrated to dryness under vacuum, and the residue dissolved in 100 ml. of chloroform. The solution is washed twice with 100 ml. portions of water, dried and concentrated to dryness to yield a dark amorphous solid. Chromatography on 50 g. of silica gel and elution with 1 to 5% methanol in chloroform yields, after crystallization from methanol, yellow crystals identified as 3-[2'-(p-chlorobenzamido)-5'-dimethylaminophenyl] - levulinic lactam (M.P. 190–193° C.).

1(a) When an equimolar amount of the t-butyl or tetrahydropyranyl ester of levulinic acid is used in place of levulinic acid in the above procedure, the product obtained is 3-[2'-(p-chlorobenzamido) - 5'-dimethylaminophenyl]-levulinic lactam.

1(b) When the acids of Table I below are used in place of hydrochloric acid in the above procedure, the product obtained is 3-[2'-(p-chlorobenzamido) - 5' - dimethylaminophenyl]-levulinic lactam.

TABLE I

| | |
|---|---|
| fluoroboric acid | zinc chloride |
| acetic acid | pyridine sulfur trioxide |
| phosphoric acid | polyphosphoric acid |

1(c) When the solvents of Table II below are used in place of t-butanol in the above procedure, the product obtained is 3-[2'-(p-chlorobenzamido) - 5' - dimethylaminophenyl]-levulinic lactam.

TABLE II

| | |
|---|---|
| benzene | acetonitrile |
| toluene | dioxane |
| dimethylsulfoxide | levulinic acid |
| methanol | levulinic acid esters |

EXAMPLE 2

1-p-chlorobenzoyl-2-methyl-5-dimethylamino-indole-3-acetic acid (I)

2.5 grams of 3 - [2' - (p - chlorobenzamido)-5'-dimethylaminophenyl]-levulinic lactam is dissolved in 150 ml. of t-butanol into which anhydrous hydrogen chloride gas had been bubbled with cooling for about five minutes. The reaction mixture is refluxed under nitrogen for two hours. The dark solution is then concentrated to dryness under vacuum and the residue dissolved in 100 ml. of chloroform. The solution is washed with water, dried and concentrated in vacuo to a dark residue. Chromatography on 50 g. of silica gel and elution with 5% methanol in chloroform yields 1 - p - chlorobenzoyl-2-methyl-5-dimethylamino-indole-3-acetic acid (M.P. 171–173° C.).

2(a) When the acids of Table I, Example 1, are used in place of hydrochloric acid in the above procedure, the product obtained is 1-p-chlorobenzoyl-2-methyl-5-dimethlyamino-indole-3-acetic acid.

2(b) When the solvents of Table II, Example 1, are used in place of t-butanol in the above procedure, the product obtained is 1-p-chlorobenzoyl-2-methyl-5-dimethylaminoindole-3-acetic acid.

EXAMPLE 3

3-[2'-(p-chlorobenzamido)-5'-dimethylaminophenyl]-levulinic acid (IV)

Into a slurry of 4.0 g. (.0138 mole) of α-p-chlorobenzoyl-p-dimethylaminophenyl hydrazine (II) in 10 ml. of methanol is led anhydrous hydrogen chloride for half-a-minute until solution is effected. The pink solution is evaporated to dryness under vacuum and pumped on an oil vacuum pump for one hour. To the powdery residue is added 300 ml. of t-butanol and 2.0 g. (0.172 mole) of levulinic acid, and the slurry heated to reflux. After 45 minutes, an additional 2.0 g. of levulinic acid is added to the dark brown solution and reflux continued for another hour. The solution is evaporated under vacuum to an oil which is dissolved in about 200 ml. of chloroform and washed twice with 100 ml. portions of water, dried and the solvent removed under vacuum. The residual oil is treated with 20 ml. of methanol and kept overnight at 25° C. Brownish crystals separate and are filtered off and recrystallized from methanol and dried to give 3-[2'-(p-chlorobenzamido)-5'-dimethylaminophenyl]-levulinic acid (IV), (M.P. 239–240° C., dec.).

3(a) When the t-butyl or tetrahydropyranyl ester of levulinic acid is used in place of levulinic acid in the above procedure, the product obtained is the corresponding ester of 3 - [2'-(p-chlorobenzamido)-5'-dimethylaminophenyl]-levulinic acid.

3(b) When the acids of Table I, Example 1, are used in place of hydrochloric acid in the above procedure, the product obtained is 3-[2'-(p-chlorobenzamido)-5'-dimethylaminophenyl]-levulinic acid or the corresponding ester.

3(c) When the solvents of Table II, Example 1, are used in place of t-butanol in the above procedure, the product obtained is 3-[2'-(p-chlorobenzamido)-5'-dimethylaminophenyl]-levulinic acid or the corresponding ester.

EXAMPLE 4

1-p-chlorobenzoyl-2-methyl-5-dimethylaminoindole-3-acetic acid hydrochloride (I)

1.0 g. of 3-[2'-chlorobenzamido) - 5' - dimethylaminophenyl]-levulinic acid is dissolved in 30 ml. of methanol to which 1 ml. of concentrated hydrochloric acid is added. The reaction mixture is heated on a steam-bath under nitrogen for 15 minutes. The dark solution is concentrated to dryness under vacuum and the residue triturated with acetone, yielding the hydrochloride of 1-p-chlorobenzoyl-2-methyl-5-dimethylaminoindole-3-acetic acid (M.P. 230–232° C.) in good yield.

4(a) When the acids of Table I, Example 1, are used in place of hydrochloric acid in the above procedure, the product obtained is 1-p-chlorobenzoyl-2-methyl-5-dimethylaminoindole-3-acetic acid.

4(b) When the solvents of Table II, Example 1, or acetone, are used in place of methanol in the above procedure, the product obtained is 1-p-chlorobenzoyl-2-methyl-5-dimethylaminoindole-3-acetic acid.

What is claimed is:

1. 3 - [2'-(p-chlorobenzamido)-5'-dimethylaminophenyl]-levulinic lactam.

2. A process for preparing 3-[2'-(p-chlorobenzamido)-5'-dimethylaminophenyl] - levulinic lactam which comprises heating α - p-chlorobenzoyl-p-dimethylaminophenyl hydrazine with levulinic acid or its t-butyl or tetrahydropyranyl ester in an inert solvent in the presence of an acid.

References Cited

UNITED STATES PATENTS 3,474,093  10/1969  McCaully et al. _____ 260—247.1

ALEX MAZEL, Primary Examiner

J. A. NARCAVAGE, Assistant Examiner

U.S. Cl. X.R.

260—326.14A, 345.7, 471R, 518R, 558H, 999